(12) United States Patent
Matsui

(10) Patent No.: US 7,472,993 B2
(45) Date of Patent: Jan. 6, 2009

(54) BIFOCAL PLASTIC LENS

(75) Inventor: Akihide Matsui, Sabae (JP)

(73) Assignee: Asahi Lite Optical Co., Ltd., Fukui-shi (JP)

( * ) Notice: Subject to any disclaimer, the term of this patent is extended or adjusted under 35 U.S.C. 154(b) by 112 days.

(21) Appl. No.: 10/559,803

(22) PCT Filed: Jun. 8, 2004

(86) PCT No.: PCT/JP2004/008309

§ 371 (c)(1),
(2), (4) Date: Feb. 1, 2006

(87) PCT Pub. No.: WO2004/109369

PCT Pub. Date: Dec. 16, 2004

(65) Prior Publication Data

US 2006/0170862 A1   Aug. 3, 2006

(30) Foreign Application Priority Data

Jun. 9, 2003   (JP) ............................ 2003-163574

(51) Int. Cl.
G02C 7/06 (2006.01)

(52) U.S. Cl. ...................... 351/168; 351/172

(58) Field of Classification Search ................ 351/168, 351/164; 623/6.24, 6.27, 6.32, 6.33
See application file for complete search history.

(56) References Cited

U.S. PATENT DOCUMENTS

| | | | |
|---|---|---|---|
| 5,223,862 A | 6/1993 | Dasher et al. | |
| 5,512,371 A | 4/1996 | Gupta et al. | |
| 5,531,940 A * | 7/1996 | Gupta et al. | ................. 264/1.7 |
| 6,179,931 B1 * | 1/2001 | Kobayashi et al. | ............ 134/38 |
| 6,769,768 B2 | 8/2004 | Nishikata | |
| 6,934,084 B2 * | 8/2005 | Pandya | ....................... 359/571 |
| 7,001,974 B2 * | 2/2006 | Kosaka | ........................ 528/73 |
| 2004/0188873 A1 * | 9/2004 | Ono et al. | .................. 264/1.32 |

FOREIGN PATENT DOCUMENTS

| | | |
|---|---|---|
| JP | 49-88534 | 8/1974 |
| JP | 53-124570 | 10/1978 |
| JP | 62-226102 | 10/1987 |
| JP | 9-511191 | 11/1997 |
| JP | 2003-344814 | 12/2003 |

* cited by examiner

Primary Examiner—Jordan M. Schwartz
(74) Attorney, Agent, or Firm—Jordan and Hamburg LLP

(57) ABSTRACT

A bifocal plastic lens having a bench lens and a small lens with different refractive powers. The small lens not protruding above a surface of the bench lens, a boundary between the constituent lenses being difficult to see. The small lens may be provided on a preparatory lens member including the small lens. Alternatively, the preparatory lens member has a concave portion for a small lens molding surface. A resin having a higher refractive index than a resin constituting other portions of the lens is adhered to a surface provided with the small lens or the concave portion to be the small lens molding surface in the preparatory lens member, and is cured and integrated.

9 Claims, 6 Drawing Sheets

BIFOCAL PLASTIC LENS

TECHNICAL FIELD

The present invention relates to a bifocal plastic lens.

BACKGROUND ART

In a bifocal plastic lens, generally, a bench lens and a small lens are constituted by the same resin. When the small lens is designed to have a smaller radius of curvature than the radius of curvature of the bench lens and a diameter of the small lens is increased in order to widen a near-sight view, an area of a far-sight section of the lens becomes small so that a field of far-sight view is reduced. When an upper part of the small lens is removed, a step is generated therein. Since the step is processed to be a plane, a boundary can be seen clearly. A mold for molding the step is hard to handle because a step portion is easily broken, and is hard to release in a molding process. Thus, there are many problems in respect of the processing. JP-A-49-88534 has described the prior art in which a step is not provided on an upper edge part of a small lens portion but the small lens portion is buried in a lens. In the invention, in order to bury a small lens formed of glass into a lens, a small lens formed of glass is disposed in a shell for casting and molding a plastic lens by using a support member and a resin monomer for a lens is then cast into the shell and is thus heated and polymerized, and a small lens is fixed into the lens. However, the support member remains in the lens. For this reason, a lower part of the cast lens is cut away for use. In addition, JP-A-53-124570 and JP-T-9-511191 have described a method of superposing and combining two types of lens-shaped resin members, thereby manufacturing a bifocal lens, in which a small lens portion takes a protruded shape.

DISCLOSURE OF THE INVENTION

It is an object of the invention to provide a bifocal lens in which a small lens portion is not protruded, and preferably, a lens in which a boundary line between a bench lens portion and a small lens portion is difficult to see.

In order to solve the problems, in the bifocal plastic lens according to the invention, it is assumed that either a preparatory lens member including a small lens or a preparatory lens member including a concave portion to be the small lens is molded previously and another resin is adhered to a surface provided with the small lens or the concave portion in the preparatory lens member, and is cured and integrated, and the small lens is thus taken into the lens and a protruded surface is not formed by the small lens. It is assumed that the "bench lens" in this specification indicates all of portions other than the small lens of the preparatory lens member including the small lens, the preparatory lens member including the concave portion to mold the small lens, and portions other than the small lens of the lens obtained after the integration.

It is assumed that a resin constituting the portion including the small lens has a refractive index which is higher than the refractive index of a resin constituting other portions to be adhered thereto.

In order to prevent a boundary surface between the small lens and the bench lens from being conspicuous in the lens, it is preferable that a thickness of a peripheral edge portion of the small lens on the boundary surface should be equal or almost equal to that of the bench lens (a thickness of the small lens itself is set to be almost zero). In the case in which a step is made on the boundary surface of the peripheral edge portion of the small lens, moreover, at least a part of the step can also be constituted by a curved surface. Alternatively, such a property as to reduce a reflected light for coloring, matting or antireflection may be given to a surface constituting the step of the upper edge portion in the small lens.

Figure 1:
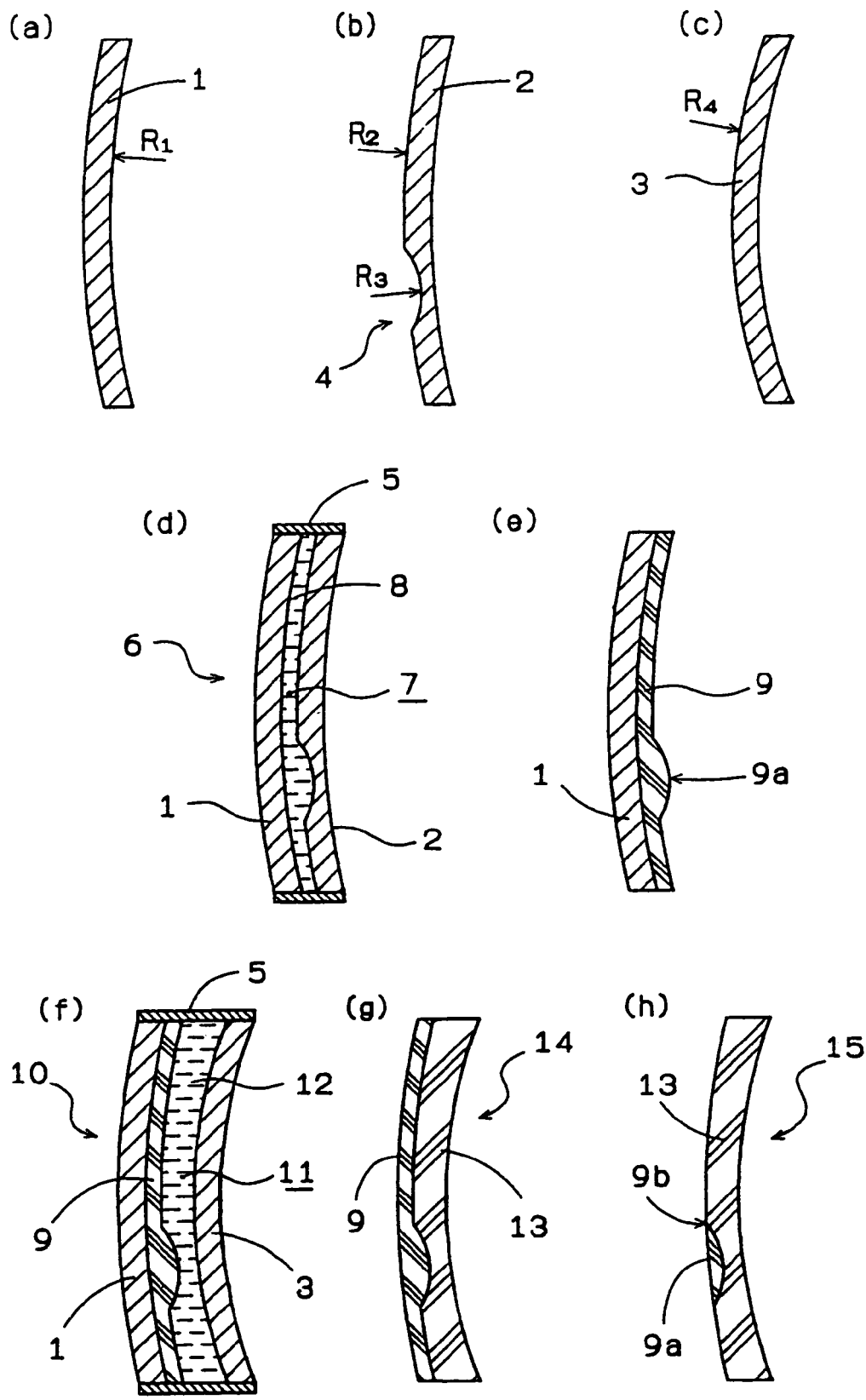
FIGS. 1(a) to (c) are longitudinal sectional views showing a mold.
FIGS. 1(d) to (f) are longitudinal sectional views showing a procedure for molding, and FIGS. 1(g) and (h) are longitudinal sectional views showing a bifocal lens according to the invention. Each of the longitudinal sectional views is a typical sectional view for explanation and so forth.

EXPLANATION OF DESIGNATIONS 1, 2, 3, 16, 16a, 17, 21 . . . mold, 4, 4a, 4b . . . mold concave portion, 5 . . . tape, 6, 10, 18, 22 . . . shell, 7, 11, 19, 23 . . . cavity portion, 8 . . . first monomer, 9 . . . preparatory lens member, 9a . . . small lens, 12 . . . second monomer, 13 . . . bench lens, 14 . . . compound lens, 15 . . . bifocal lens, 20 . . . preparatory lens member, 20a, 20b . . . small lens, 25 . . . compound lens, 26 . . . step, 26a, 26b . . . curved surface, 30, 33, 40, 43 . . . mold, 31, 41 . . . preparatory lens member, 32, 42 . . . small lens molding surface, 34, 44 . . . shell, 35, 45 . . . cavity portion, 36, 46 . . . small lens molding member, 37, 47 . . . compound lens, 38, 48 . . . small lens, 39, 49 . . . bifocal lens.

BEST MODE FOR CARRYING OUT THE INVENTION

A bifocal lens according to the invention is characterized in that either a preparatory lens member including a small lens or a preparatory lens member including a concave portion to make a small lens is molded previously and another resin is adhered to a surface provided with the small lens or the concave portion in the preparatory lens member, and is cured and integrated and the small lens is taken into the lens to prevent a protruded surface from being formed by the small lens, and a lens having two types of optical resins superposed and stuck together is constituted in principle and the small lens is formed in a stuck portion. Either of the two types of resins is ground and polished to regulate a refractive power. Thus, it is possible to obtain a bifocal plastic lens having no portion protruded by the small lens. Since there is no protruded portion, a yield in a coating step of hard-coat, primer and so on can be enhanced and a user can also easily remove the stains of the lens. In some cases in which an episulfide resin having a high refractive index of 1.74 is used in a lens for glasses. This resin cannot be dyed. According to the invention, however, it is possible to dye the whole lens by using a resin having an easy dyeing property for another resin to be superposed.

In the lens, the resin constituting the portion including the small lens has a higher refractive index than the refractive index of a resin constituting other portions to be adhered thereto. Consequently, a reduction in a radius of curvature of the small lens can be relieved so that a predetermined additional power can be set. Thus, the small lens can be conveniently taken into the lens.

As a procedure for molding the lens according to the invention, it is preferable to employ a structure in which a mold having a small lens molding surface on an optical molding surface is used to first mold a preparatory lens member constituted by a thermoplastic resin or a thermosetting resin to which the small lens molding surface is transferred, and subsequently, another resin is cast onto the small lens molding surface side of the preparatory lens member and is thus cured, and the small lens molding portion is taken into the lens and is not protruded therefrom.

For the mold having the small lens molding surface, the small lens molding surface constituted by a concave surface or a convex surface is used. In the invention, however, the small lens is molded by either of the two types of resins to be superposed which has a higher refractive index as described above. Therefore, the small lens is molded integrally with the preparatory lens member in the case in which the preparatory lens member is molded by the resin having a higher refractive index, and the small lens molding surface is formed by only the concave surface but the small lens is not constituted integrally in the case in which the preparatory lens member is molded by the resin having a lower refractive index. Accordingly, another resin having a high refractive index is cast onto the small lens molding surface side taking a concave shape and is heated and polymerized, and the resin is adhered to and integrated with the concave surface in the process.

The lens according to the invention has such a structure that the small lens is taken into the lens as described above. However, a boundary surface between the small lens and a bench lens can be confirmed visually. In order to prevent the boundary surface from being conspicuous, therefore, it is preferable that the thickness of the peripheral edge portion of the small lens on the boundary surface should be equal or almost equal to that of the bench lens. In the case in which a step in a direction of a thickness is generated on the boundary surface between the small lens and the bench lens, moreover, it is preferable that at least a part thereof should be constituted by a curved surface.

More specifically, the shape in which the thickness of the peripheral edge portion of the small lens is equal or almost equal to that of the bench lens utilizes the fact that the thickness of the peripheral edge portion is reduced because a radius of curvature of the small lens is smaller than that of the bench lens. In general, a conventional lens also has a structure in which a thickness in a portion other than the upper edge portion of the small lens in an attachment to glasses is equal to the thickness of the bench lens and a boundary line between the small lens and the bench lens is difficult to see. In a conventional bifocal plastic lens, however, both of them are molded by a single resin and a step is provided on the upper edge portion of the small lens to determine an additional power with a variation in the radius of curvature of the small lens, and the step portion is constituted by a plane. Thus, there is employed a structure in which a boundary surface can easily be seen. In the invention, since the resin having a high refractive index is used for the small lens portion, a reduction in the radius of curvature of the small lens can be relieved. When constituting this portion by a curved surface in at least a part thereof in place of a complete plane, therefore, it is possible to make the boundary surface to be difficult to see since the step appears inside the lens. However, this is different from a progressive shape.

In order to prevent the boundary surface from being conspicuous, more specifically, it is possible to use a mold in which a chamfered portion constituted by a curved surface is formed on the step of the boundary surface between the upper edge portion of the small lens and the bench lens. It is assumed that the chamfered portion has a radius of curvature of 0.1 to 1.0 R. Since a leap in a refractive power is generated in this portion, however, a width is set to be as small as possible.

In order to prevent the boundary surface from being conspicuous, such a property as to reduce a reflected light including coloring, matting or antireflection can also be given to a surface constituting the step of the upper edge portion of the small lens. Since the surface of the step generated in the upper edge portion of the small lens is constituted to be an adhering surface of two types of resins on which the small lenses is superposed, it serves as an interface of different resins and has such a property that a transmitted ray is reflected. In order to lessen or remove the reflected light, such a property as to reduce the reflected light is given. In the case in which the bifocal lens is a colored lens, a step is colored with a coloring agent of the same type so that the step is difficult to see. In the preparatory lens member which is molded, moreover, a step portion may be rubbed with abrasive grains to create a mat surface. Furthermore, it is also possible to disperse particulates having a particle diameter of 20 to 200 nm such as $SiO_2$ in a silicone type coupling agent, applying them onto the step portion and carrying out heating and drying to fix inorganic particulates like a layer, thereby forming a heterogeneous film to give an antireflection function.

In the lens according to the invention, moreover, the small lens and the bench lens can be set to have different color tones from each other. Referring to the dyeing of the plastic lens, the degree of the dyeing is varied depending on the type of a resin constituting the lens. As an extreme example, an episulfide type resin having a high refractive index is hard to dye. Accordingly, it is possible to provide a lens in which a small lens and a bench lens have different color tones by an immersion of the whole lens according to the invention in a dye liquor. In case of a far-sight view, there is no problem even if the quantity of a light is insufficient. In the case in which a character is to be seen through the small lens, however, a brightness which is as great as possible is preferred. It is also possible to obtain a convenient lens by changing the degree of the dyeing.

As described above, in the bifocal plastic lens according to the invention, the small lens is set to be included in the lens by using the resin having a high refractive index. Therefore, the surface of the lens has no step so that a hard coat and an antireflection film can easily be formed and stains can also be removed easily. In the case in which the thickness of the peripheral edge portion of the small lens is set to be equal or almost equal to the thickness of the bench lens on which the small lens is formed or the boundary surface generating the step is constituted by a curved surface in place of a plane, moreover, the boundary surface is difficult to see. Consequently, the bifocal lens is suitable for a person who does not like to look older when wearing bifocal lenses. In addition, it is possible to manufacture, in accordance with the invention, a bifocal plastic lens in which there is no step even if a boundary line is seen. The highest refractive index in the application of the invention is 1.737 of the episulfide resin. Even if a resin having a higher refractive index appears, furthermore, it is possible to practically use the invention by simply changing a design value of a radius of curvature.

Examples of the invention will be described below and the invention is not restricted to these examples.

EXAMPLE 1

In FIG. 1, (a) and (b) are typical sectional views showing a pair of glass molds, which will be hereinafter simply referred to as sectional views. Moreover, a radius of curvature will be simply referred to as a curvature. Radius of curvatures $R_1$ and $R_2$ of molding surfaces of molds 1 and 2 give the same spherical surfaces. The surface having the radius of curvature $R_2$ is provided with a concave portion 4 having a radius of curvature $R_3$ which molds a small lens. FIG. 1(c) is a sectional view showing a mold 3 for molding a concave surface side of a compound lens which will be described below, and the molding surface has a radius of curvature of $R_4$. FIG. 1(d) shows a shell 6 in which peripheral edge portions of the molds 1 and 2 are sealed with a tape 5. A first monomer 8 is cast into a cavity portion 7 in the shell and is heated and polymerized, and the mold 2 is released so that a preparatory lens member 9 including a small lens 9a shown in FIG. 1(e) is obtained. At this time, the preparatory lens member 9 is maintained to be adhered to the mold 1. In FIG. 1(f), peripheral edge portions of the mold 1 and the mold 3 for the preparatory lens member 9 are sealed with the tape 5 to create a shell 10. A second monomer 12 is cast into a cavity portion 11 in the shell and is heated and polymerized, and the molds 1 and 3 are then released to obtain a compound lens 14 in which a bench lens 13 covering a small lens portion and the preparatory lens member 9 are adhered to each other in a polymerizing process as shown in FIG. 1(g). The compound lens is a semifinished lens and a concave surface side is properly ground and polished and is formed to be a toric surface corresponding to the regulation of a refractive power and a power to correct astigmatism so that a bifocal lens is finished.

In the compound lens 14, moreover, a convex surface side is ground and polished to create a bifocal lens 15 having only a small lens 9a adhered thereto as shown in FIG. 1(h). A peripheral edge portion 9b of the small lens 9a has a feature that a thickness is equal to a thickness of a bench lens, and a height protruded from a curved surface of the bench lens is zero and a boundary line with the bench lens is difficult to see.

Description will be given to an example in which a calculation is carried out by using an actual numeric value in FIG. 1(h).

First monomer: MR174 manufactured by MITSUI CHEMICALS, INC., Nd=1.737

Second monomer: MR6 manufactured by MITSUI CHEMICALS, INC., Nd=1.594

$R_1$ (radius of curvature on a concave surface side of the mold 1)=200.00 (mm)

$R_2$ (radius of curvature on a convex surface side of the bench lens and the small lens)=200.00

$R_3$ (radius of curvature on an eye-facing side of the small lens) which will be described below $R_4$ (radius of curvature on a concave surface side of the bench lens)=100.00

Surface refractive power D=(Nd−1)/R×1000 (mm)

Thus, Table 1 shows a result obtained by calculating an additional power and the radius of curvature $R_3$ on the eye-facing side in the small lens.

TABLE 1

| | Additional power | | | | | | | |
|---|---|---|---|---|---|---|---|---|
| 1.00 | 1.25 | 1.50 | 1.75 | 2.00 | 2.25 | 2.50 | 2.75 | 3.00 |
| $R_3$ 500.0 | 270.0 | 180.0 | 138.0 | 111.0 | 93.0 | 80.0 | 70.3 | 62.5 |

EXAMPLE 2

Figure 2:
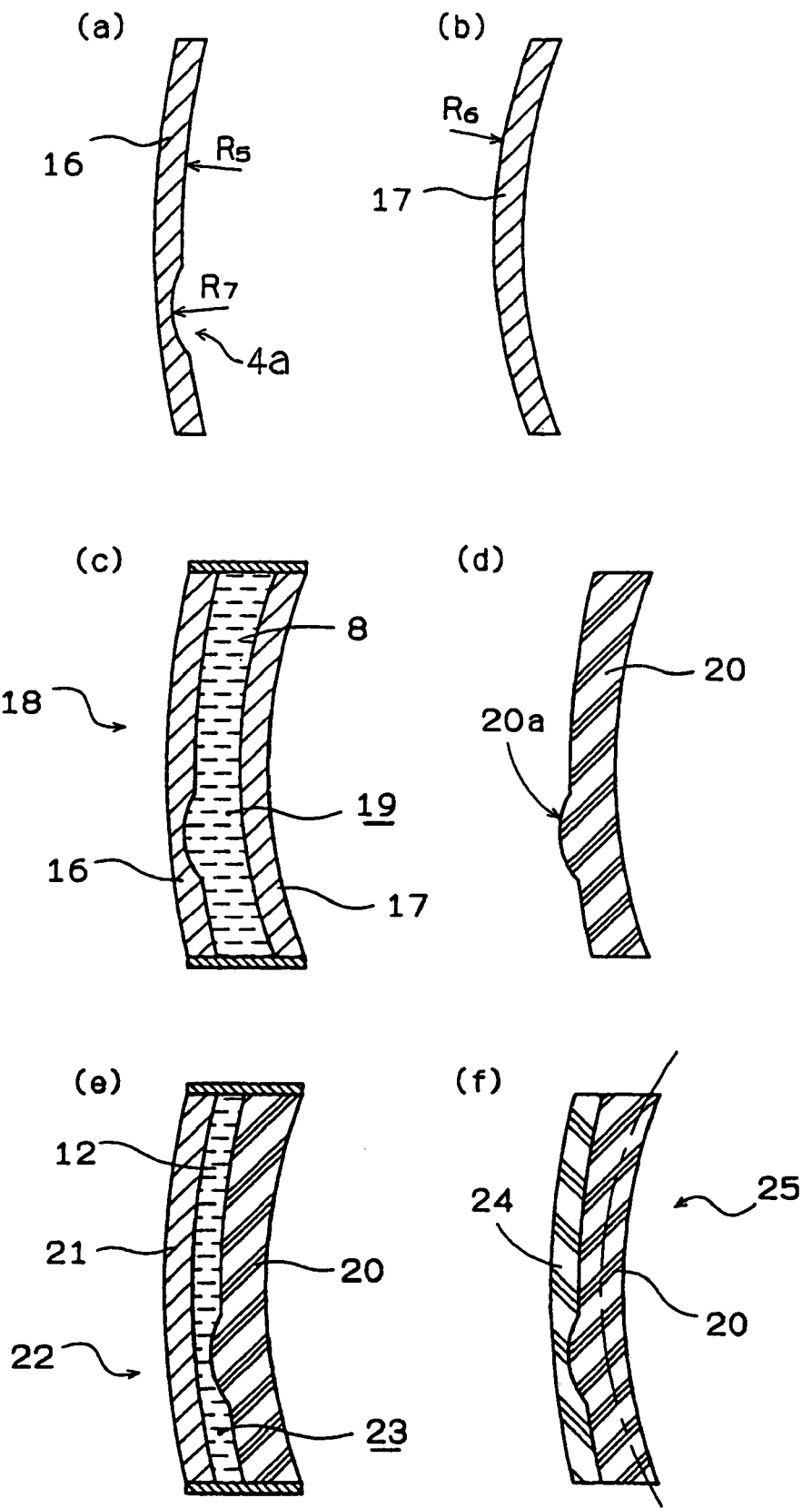
FIG. 2 is a longitudinal sectional view showing another embodiment, and (a) and (b) are longitudinal sectional views showing a mold and (c) to (e) are longitudinal sectional views showing a procedure for molding, and (f) is a longitudinal sectional view showing a bifocal lens according to the embodiment.

Next, description will be given to another embodiment of the compound lens. FIG. 2(a) shows a mold 16 in which a small lens molding surface is formed on a concave surface side. The concave surface side for molding a bench lens is a spherical surface having a radius of curvature of $R_5$ and is provided with a concave portion 4a having a radius of curvature of $R_7$ which molds a small lens. FIG. 2(b) shows a mold 17 forming a convex surface side of the bench lens, and the convex surface has a radius of curvature of $R_6$. By using these molds, a peripheral edge portion is sealed with a tape 5 to create a shell 18, and the first monomer 8 is cast into a cavity portion 19 and is heated and polymerized and the molds are then released as shown in FIG. 2(c) so that a preparatory lens member 20 including a small lens 20a shown in FIG. 2(d) is obtained. As shown in FIG. 2(e), then, the preparatory member 20 and a mold 21 having radius of on a concave surface side which is equal to a radius of curvature on a convex surface side of the preparatory member are used and peripheral edge portions are sealed with the tape 5, thereby creating a shell 22, and the second monomer 12 is cast into a cavity portion 23 and is heated and polymerized, a cast molded member 24 is polymerized and adhered and the mold 21 is released so that a compound lens 25 shown in FIG. 2(f) is obtained. Also in this case, a small lens is set in the second monomer having a low refractive index. The concave surface side is ground and polished as shown in a one-dotted chain line and a refractive power, a power to correct astigmatism and an astigmatism axis are regulated to obtain a bifocal lens.

An additional power and a radius of curvature of a small lens according to the example 2 are as follows.

First monomer: MR174 manufactured by MITSUI CHEMICALS, INC., Nd=1.737

Second monomer: MR6 manufactured by MITSUI CHEMICALS, INC., Nd=1.594

$R_5$ (radius of curvature on a concave surface side of the mold 16)=368.5 (mm)

$R_6$ (radius of curvature on a convex surface side of the bench lens)=150.00

$R_7$=radius of curvature on an objective side of the small lens

Surface refractive power D=(Nd−1)/R×1000 (mm)

Table 2 shows a result obtained by calculating the additional power and the radius of curvature $R_7$ on the eye-facing side of the small lens in accordance with the equation.

TABLE 2

| | Additional power | | | | | | | | |
|---|---|---|---|---|---|---|---|---|---|
| | 1.00 | 1.25 | 1.50 | 1.75 | 2.00 | 2.25 | 2.50 | 2.75 | 3.00 |
| $R_7$ | 100.0 | 87.50 | 75.00 | 67.00 | 60.00 | 54.50 | 49.50 | 45.50 | 42.20 |

EXAMPLE 3

While the monomer having a high refractive index of 1.737 has been used in the example 1, description will be given to an example in which the same object can be achieved even if the refractive index is varied.

First monomer: MR-7 manufactured by MITSUI CHEMICALS, INC., Nd=1.660

Second monomer: CR-39 manufactured by PPG, Nd=1.498

Figure 5:
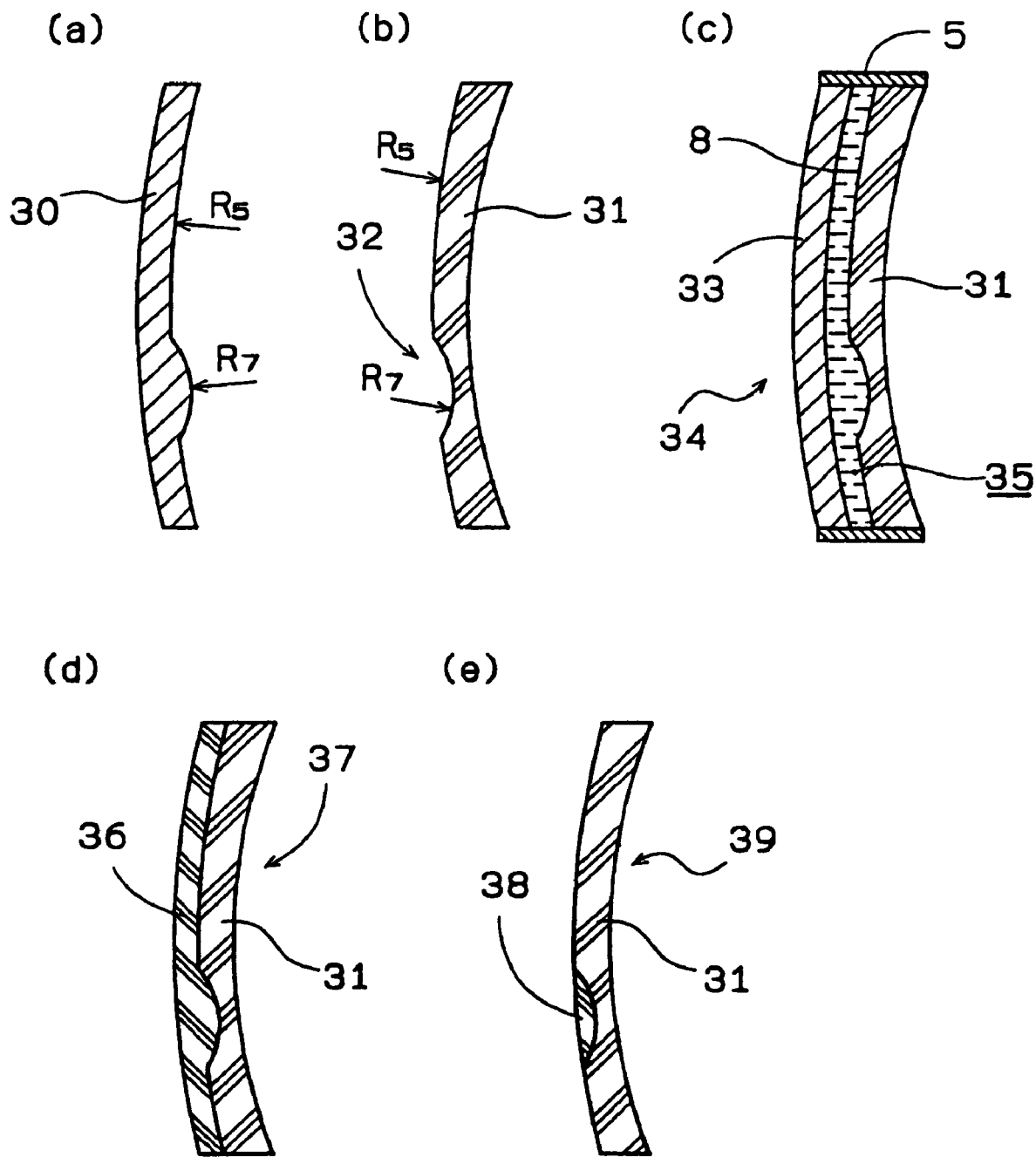
FIG. 5(a) is a sectional view showing a mold having a convex small lens molding surface on a concave surface side.
FIG. 5(b) is a view showing a preparatory molded product.
FIG. 5(c) is a view showing a shell.
FIG. 5(d) is a view showing a compound lens which is molded.
FIG. 5(e) is a sectional view showing a bifocal lens.

In order to adhere these monomers, it is necessary to first polymerize and cure the second monomer and to then cast the first monomer. For the mold, a mold shown in FIG. 5 is used.

$R_5$ (radius of curvature on a concave surface side of a mold 30)=332.5 (mm)

Radius of curvature on a concave surface side of a mold 33)=332.5 (mm)

$R_7$=radius of curvature on an eye-facing side of a small lens

Table 3 shows a result obtained by calculating an additional power and the radius of curvature $R_7$ on an eye-facing side of a small lens in the same manner as in the example 1. In comparison for an additional power of 3.00, $R_7$ is 66.86. As compared with the example 1, a monomer having a lower refractive index is used and the radius of curvature has an almost equal value.

TABLE 3

| | Additional power | | | | | | |
|---|---|---|---|---|---|---|---|
| | 1.00 | 1.25 | 1.50 | 1.75 | 2.00 | 2.25 | 2.50 |
| $R_7$ | 332.5 | 223.34 | 167.39 | 133.84 | 111.50 | 95.55 | 83.59 |

| | Additional power | |
|---|---|---|
| | 2.75 | 3.00 |
| $R_7$ | 74.30 | 66.86 |

EXAMPLE 4

Figure 3:
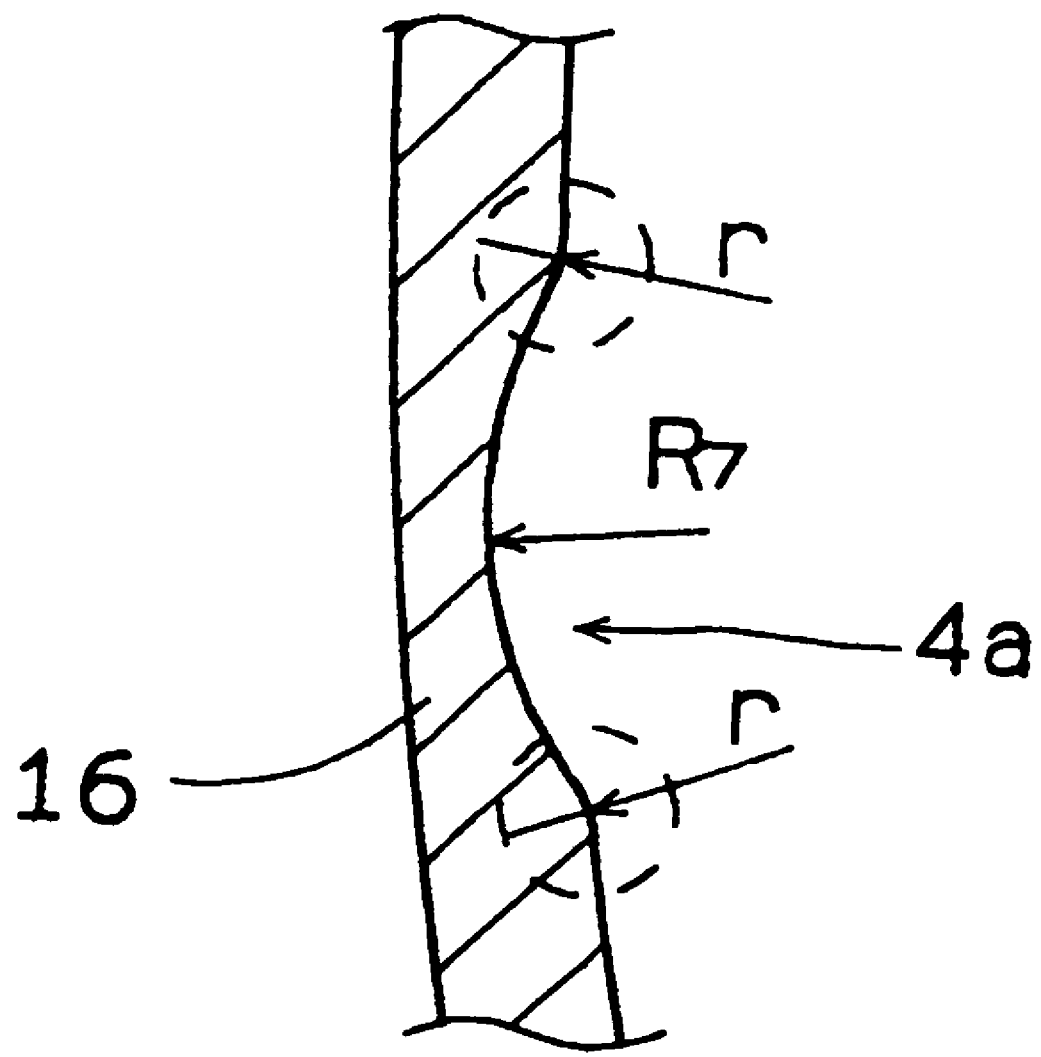
FIG. 3 is a longitudinal sectional view showing a mold of a portion for molding a small lens.

The bifocal lens according to the invention has a feature that a boundary line between a small lens and a bench lens is difficult to see, and FIG. 3 shows an enlarged part of the mold 16 illustrated in FIG. 2(a). Over a boundary surface formed by the concave portion 4a having the radius of curvature $R_7$ which molds the small lens 20a and the bench lens molding surface (a portion surrounded in a broken line), a thickness of a protrusion of the small lens (a height) is zero and the lens is seen to be a line from a front. The reason is that a discontinuous surface for a refractive power is generated. Accordingly, the boundary surface is chamfered with a radius of curvature of r in order to see the boundary line with more difficulty. In this case, it is preferable that a radius having the radius of curvature of r should range from 0.1 mm to 1 mm, and a range of a leap in a refractive power is set to be as small as possible.

Figure 4:
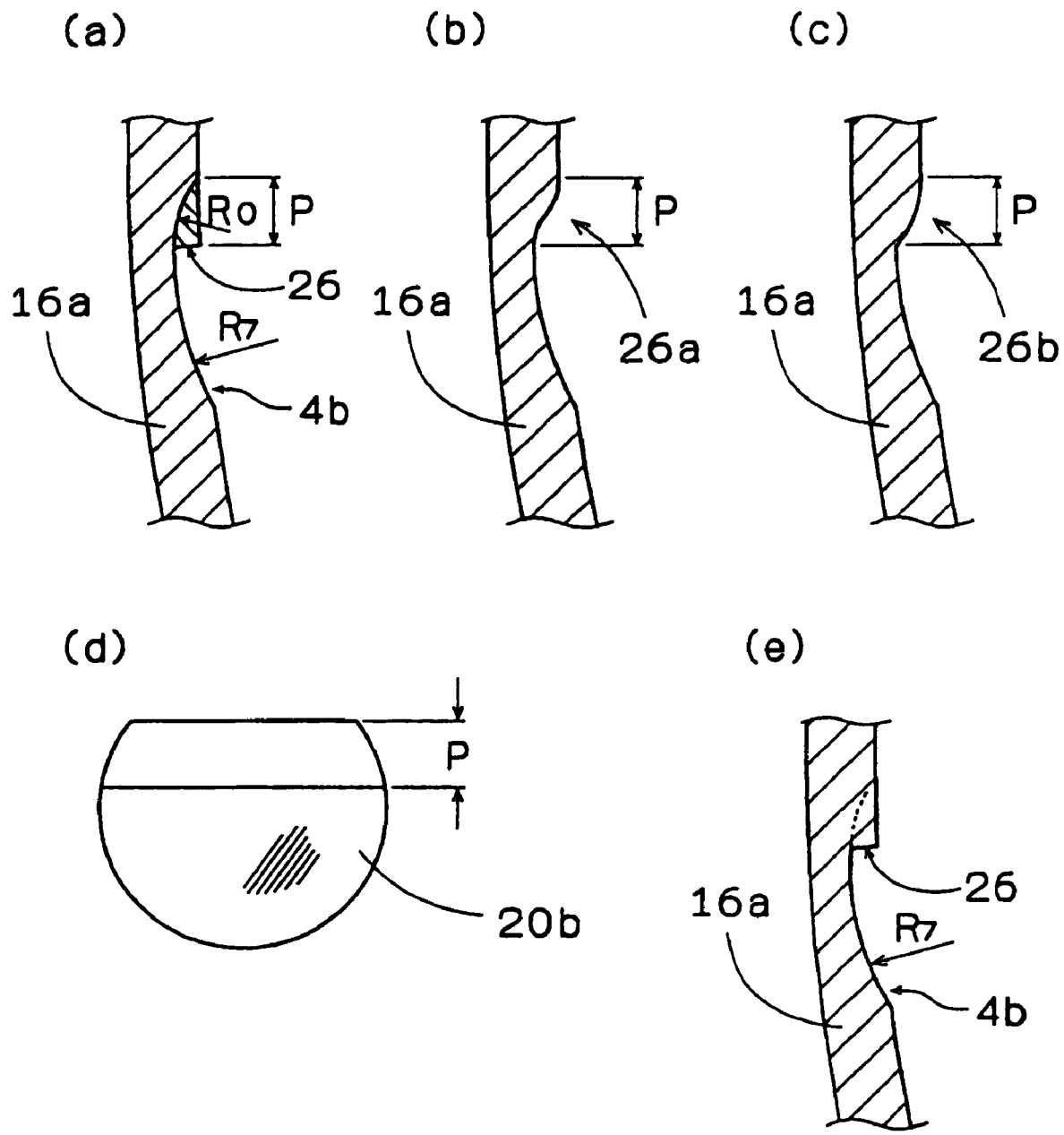
FIG. 4(a) is a longitudinal sectional view showing another embodiment of the portion for molding a small lens, FIGS. 4(b) and (c) are sectional views showing an example in which steps are connected to each other through a curved surface.
FIG. 4(d) is a front view showing the small lens.
FIG. 4(e) is a sectional view showing a conventional small lens portion.

The small lens in each of the examples 1 and 2 simply indicates a procedure for an arrangement of the small lens in the preparatory lens member, and the small lens is drawn in a small diameter and a field of near-sight view is small. When the diameter of the small lens is increased in order to widen a field of view, an upper part of the small lens enters a far-sight section so that the field of the far-sight view is reduced. In order to eliminate the drawback, it is preferable to provide a step 26, thereby deleting the upper part of the small lens to widen the field of far-sight view as shown in FIG. 4(e). Although the step 26 is seen to be a surface having a great width from the front of the lens, it is an interface of resins having different refractive indices in the bifocal lens according to the invention and a transmitted ray is reflected.

In order to cause this surface to be difficult to see, a portion having a width P is connected in a smaller radius of curvature $R_0$ than a radius of curvature $R_7$ and a thickness of a protruded small lens is set to be equal to that of a bench lens as shown in FIG. 4(a). It is preferable that the width P portion should range from 1 mm to 2 mm because a leap in a refractive power is generated. As shown in (b) and (c), moreover, it is possible to make the boundary surface difficult to see by forming curved surfaces 26a or 26b with one or two radius of curvatures. The lens is seen from the front as shown in FIG. (d). Although the boundary line of the upper edge portion of the small lens is eliminated, an image is distorted in the portion corresponding to the width P. A line showing the upper edge portion of a small lens 20b is not restricted to a straight line but can also be a curve.

While the step 26 constitutes a surface and the step can be seen clearly by the reflection of a transmitted light over the transfer surface of the preparatory lens member which is molded as described above, it is also possible to prevent the step from being conspicuous by lessening a quantity of the reflected light. More specifically, it is preferable to absorb or irregularly reflect the reflected light. For example in order to carry out the irregular reflection, a surface of the step 26 is processed with abrasive grains so as to have a matte finish on its surface; the matte surface being transferred onto the preparatory lens member in molding. Moreover, the protruded step 26 surface may be colored in a stage in which the preparatory lens member is molded. This method is particularly effective for the case in which the lens is colored for use, and the surface of the step is rarely conspicuous if it is colored in the same color tone. It is possible to use a dye or a paint for a coloring agent. When a solution in which $SiO_2$ having a particle diameter of 20 to 200 nm is dispersed in a silicone type coupling agent is applied onto the surface of the step and is heated and cured, moreover, the particulates are fixed densely to the surface of the step and a heterogeneous film of $SiO_2$ is formed so that a ray can be prevented from being reflected.

EXAMPLE 5

FIG. 5(a) is a sectional view showing a mold 30 in which a small lens molding surface is provided like a convex on a concave surface side. Although such a mold has been hard to polish, the polishing can be carried out by the progress of a polishing technique. A polyamide resin or a polycarbonate resin is used as a thermoplastic resin to mold a preparatory lens member 31 shown in FIG. 5(b) by an injection molding method or a pressure molding method so that a concave portion 32 of the small lens molding surface is formed. A mold 33 having an equal radius of curvature to the radius of curvature of an objective surface of the preparatory lens member at a concave surface side and the preparatory lens member 31 are sealed at a peripheral edge portion with a tape 5, thereby creating a shell 34. The first monomer 8 (a refractive index of 1.737) is cast into a cavity portion 35 and is heated, polymerized and cured to obtain a compound lens 37 in which a small lens molding member 36 and the preparatory lens member 31 are adhered to each other as shown in FIG. 5(d). The compound lens may be formed into a finished lens by polishing a concave surface side to regulate a refractive power, and the small lens molding member 36 may be ground and polished to leave only the small lens 38 as shown in FIG. 5(e) in order to obtain a bifocal lens 39 in which the preparatory molded product 31 formed of a thermoplastic resin having a low refractive index and the small lens formed of a resin having a high refractive index are formed integrally. The bifocal lens takes the same shape as the shape of the lens described in the example 1.

In some cases in which an urethane type or episulfide type resin monomer is to be cast into a preparatory lens member using a thermoplastic resin, an interface of these resins becomes cloudy. In such cases, it is possible to form a protective film on the preparatory lens member by using a silane coupling agent. In order to form a film, it is possible to use a dipping method, and there is properly used a solution prepared by suitably mixing γ-aminopropyl triethoxy silane, γ-mercaptopropyl trimethoxy silane, γ-methacryloxypropyl trimethoxy silane, methyltrimethoxysilane, γ-aminopropyl triethoxy silane and so on. This is pulled up at a speed of 150 to 200 mm every minute and is heated and cured at 130° C. for 10 to 20 minutes to form a protective film so that the cloud can be eliminated and the adhesion of two types of resins can also be enhanced.

Figure 6:
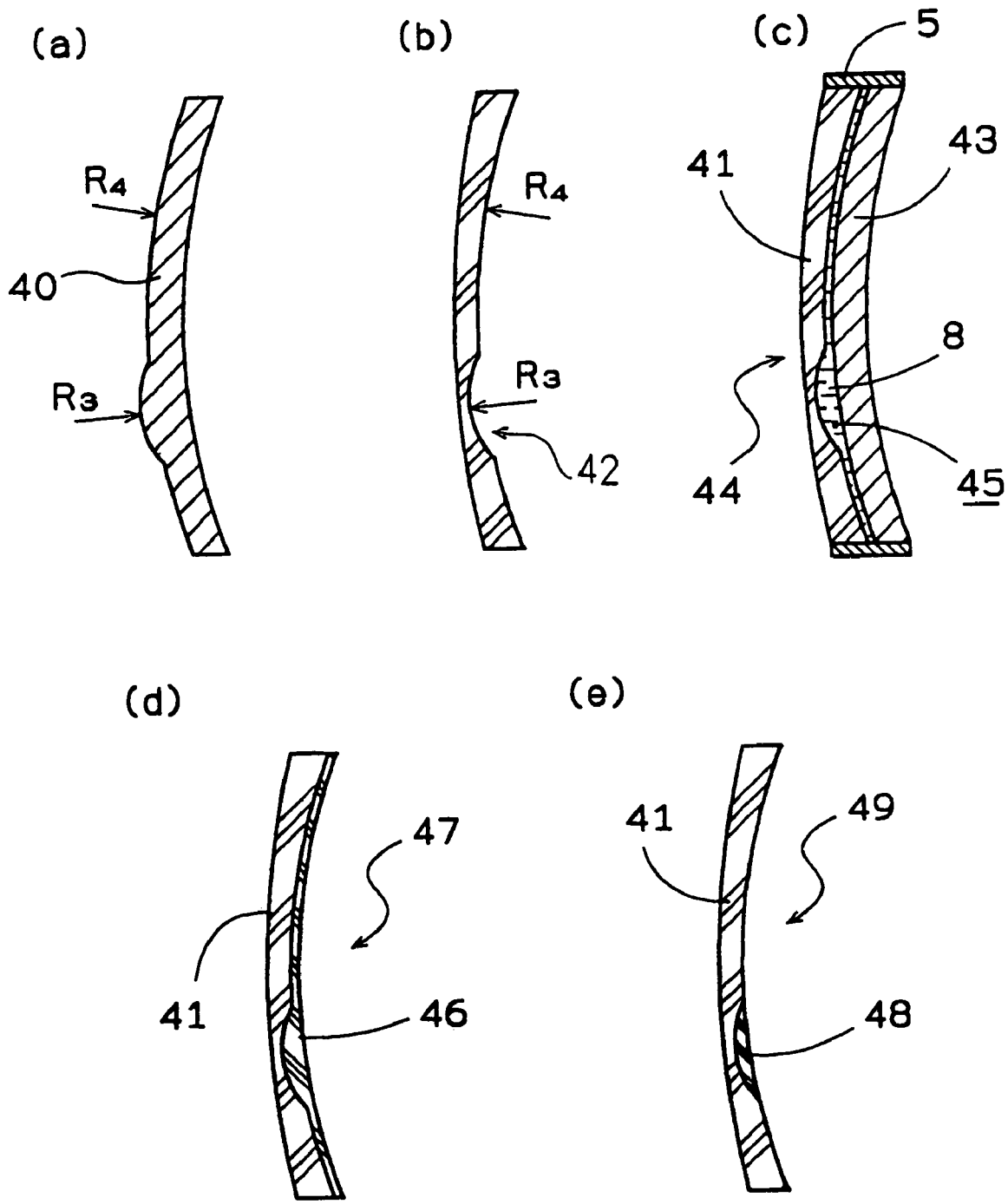
FIG. 6(a) is a sectional view showing a mold having a convex small lens molding surface on a convex surface side.
FIG. 6(b) is a view showing a preparatory molded product.
FIG. 6(c) is a view showing a shell.
FIG. 6(d) is a view showing a compound lens.
FIG. 6(e) is a sectional view showing a bifocal lens.

FIG. 6(a) shows a mold 40 in which a small lens molding surface is provided like a convex on a convex surface side. Consequently, a preparatory lens member 41 formed of a polycarbonate resin provided with a small lens molding surface 42 is molded as shown in FIG. 6(b). A mold 43 having, on the convex surface side, an equal radius of curvature to the radius of curvature of the concave surface side of the preparatory lens member is used to create a shell 44 and the first monomer 8 is cast into a cavity portion 45, and is heated and polymerized and the mold 43 is then released. Consequently, there is obtained a compound lens 47 in which a small lens molding member 46 and the preparatory lens member 41 are formed integrally as shown in FIG. 6(e). When a concave surface side of the compound lens is ground and polished, a bifocal lens having a small lens 48 formed on the concave surface side can be obtained.

While the resin having a high refractive index is used on the side where the small lens is to be molded and the resin having a lower refractive index is used on the bench lens side in each of the examples 1, 2 and 5, it is possible to form an inexpensive bench lens by injection molding or pressure molding by using a thermoplastic resin having a low refractive index when forming the small lens molding surface like a concave on the bench lens side as in the example 5. In the case in which a resin having a high refractive index is to be cast into the small lens molding surface, it is also possible to cast the resin monomer into only the small lens molding portion and to carry out heating and polymerization, and furthermore, to separately mold a small lens and to bond the small lens with an optical adhesive or a monomer.

Although the bench lens is varied depending on a type to be produced, a radius of curvature on an objective side is properly determined in a design. In the invention, an equal radius of curvature is used on an objective side and an adhered surface of a compound lens to be finished. Accordingly, a preparatory lens member having the same radius of curvature is the bench lens. Since the lens molded earlier serves as a mold conceptually, however, it is represented as the bench lens.

The invention is not restricted to these examples but a finished product having a radius of curvature on an objective side and that of an adhered surface which are different from each other can also be set to be a manufactured product. For this reason, the invention also includes such a lens.

INDUSTRIAL APPLICABILITY

Since a small lens is not protruded but a boundary of the small lens can be prevented from being conspicuous in the bifocal plastic lens according to the invention, it is useful as a lens for a pair of bifocals having an excellent handling property and appearance.

The invention claimed is:

1. A bifocal plastic lens comprising a small lens for short-range view,
   wherein a preparatory lens member having the small lens protruded on a convex surface side is molded from a resin comprising an episulfide resin having a refractive index of not smaller than 1.66 (nd) and another resin having a lower refractive index compared with the preparatory lens member is cast and cured so as to adhere to the surface provided wit the small lens of the preparatory lens member and to be integrated with the preparatory lens member, resulting in that all over the surface provided with the small lens is covered by the resin having lower refractive index and the small lens is incorporated into the resulting bifocal lens in such a manner that the small lens does not cause a protrusion to form on any external surface of the resulting bifocal lens,
   a concave surface side of the preparatory lens member is employed as a surface having a corrective refractive power, and
   the bifocal plastic lens having an interface between the convex surface of the prepatory lens and the resin adhered to the convex surface of the preparatory lens wherein at least a part of the interface by a peripheral edge portion of the small lens is chamfered with a curved surface having a curvature lower than the curvature by portions of the small lens other than the peripheral edge portion in order to prevent the edge of the small lens from being conspicuous.

2. The bifocal plastic lens according to claim 1, wherein at least one property for reducing a reflected light selected from coloring, matting and antireflection is given to a surface of a step generated on the boundary surface of the peripheral edge portion of the small lens.

3. A bifocal plastic lens comprising a small lens for short-range view,
   wherein a preparatory lens member having the small lens protruded on a convex surface side is molded from a resin comprising an episulfide resin having a refractive index of not smaller than 1.66 (nd) and another resin having a lower refractive index compared with the preparatory lens member is cast and cured so as to adhere to the surface provided with the small lens of the preparatory lens member and to be integrated with the preparatory lens member, resulting in that all over the surface provided with the small lens is covered by the resin having lower refractive index and the small lens is incorporated into the resulting bifocal lens in such a manner that the small lens does not cause a protrusion to form on any external surface of the resulting bifocal lens, and a concave surface side of the preparatory lens member is employed as a surface having a corrective refractive power: and further comprising a step, the small lens being truncated thereby forming a truncated edge, the step provided along the truncated edge of the small lens between the convex surface side of the prepatory lens and the resin adhered to the convex surface side of the prepatory lens, the step comprised of material having a refractive index such that a light ray incident on the step is reflected, and the curvature of the step is less than the curvature of the small lens.

4. The bifocal plastic lens according to claim 3, wherein the step at an interface between the step and the prepatory lens is characterized by a matte boundary surface.

5. The bifocal plastic lens according to claim 3, wherein the step is colored.

6. The bifocal plastic lens according to claim 1, wherein the chamfered curved surface has a curvature between 0.1 and 1 mm.

7. The bifocal plastic lens according to claim 1, wherein the chamfered curved surface is along the entire periphery of the small lens.

8. The bifocal plastic lens according to claim 1, wherein the prepatory lens consists of a single layer of resin.

9. The bifocal lens of claim 1, wherein the concave side of the bifocal lens may be ground to adjust a corrective power of the bifocal lens.

* * * * *